Feb. 20, 1968    P. A. GILOVICH ET AL    3,370,300
STRIP CHART RECORDER
Filed May 4, 1966

INVENTOR.
Paul A. Gilovich
Clair E. Miller

Attorneys

United States Patent Office 3,370,300
Patented Feb. 20, 1968

3,370,300
STRIP CHART RECORDER
Paul Anthony Gilovich, Santa Clara, and Clair Eugene Miller, Palo Alto, Calif., assignors to Dohrmann Instruments Company, San Carlos, Calif., a corporation of California
Filed May 4, 1966, Ser. No. 547,497
9 Claims. (Cl. 346—113)

ABSTRACT OF THE DISCLOSURE

Strip chart recorder having convenient chart loading arrangement and having internally generated X input events which are inhibited while the marking pen is moving.

This invention relates to a strip chart recorder and more particularly to a strip chart recorder with a stepping motor drive.

In strip chart recorders heretofore provided, it oftentimes has been difficult and time consuming to load the chart paper into the recorder particularly with rack mounted recorders. Also, in such recorders, it has been difficult to provide a reference other than a time reference because it was difficult, if not impossible, to obtain a stepping motor of a reasonable size to operate with such a recorder. There is, therefore, a need for a new and improved strip chart recorder.

In general, it is an object of the present invention to provide a strip chart recorder which overcomes the above-named disadvantages.

Another object of the invention is to provide a strip chart recorder of the above character which is particularly adapted for rack mounting.

Another object of the invention is to provide a strip chart recorder of the above character in which a tilt-out construction is provided to facilitate easy loading of the chart paper.

Another object of the invention is to provide a strip chart recorder of the above character in which a recording reference other than time can be utilized.

Another object of the invention is to provide a strip chart recorder of the above character which utilizes a stepping motor drive.

Another object of the invention is to provide a strip chart recorder of the above character which utilizes a null balance potentiometric drive for the pen.

Additional objects and features of the invention will appear from the following description in which the preferred embodiment is set forth in detail in conjunction with the accompanying drawings.

Referring to the drawings.

Figure 1:
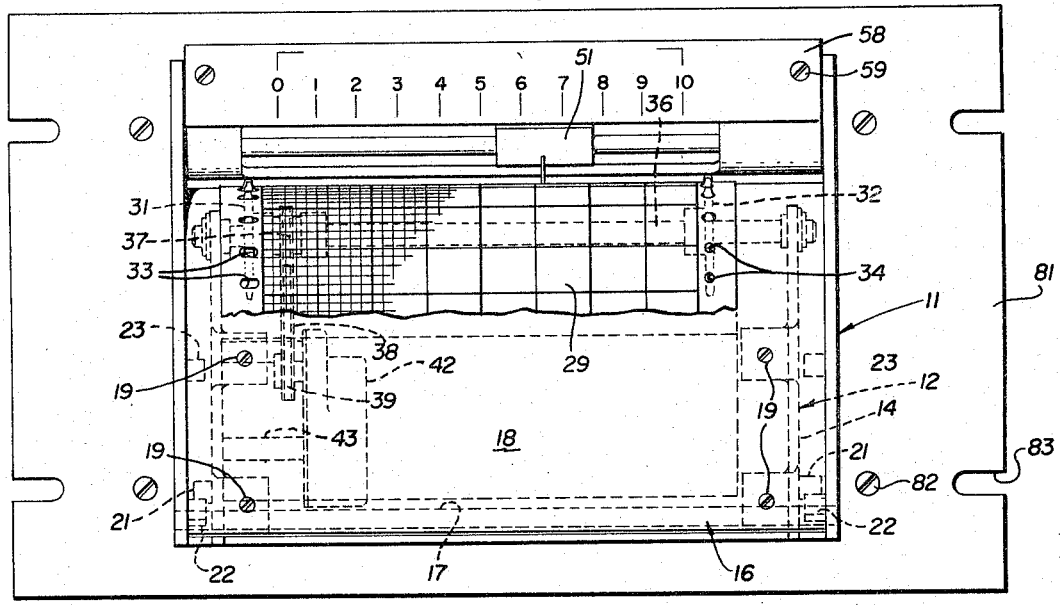
FIGURE 1 is a front elevational view of a strip chart recorder incorporating the present invention and which is suitable for rack mounting.

In general, the strip chart recorder consists of a framework with a frame including a front panel pivotally mounted in the framework. A roll of chart paper is rotatably mounted in the frame. The frame with the roll of chart paper is movable from a normal position to a tilted-out position to facilitate loading and unloading of the chart paper. Means is mounted on the frame for advancing the chart paper from the roll and pen means is provided which is adapted to engage the chart paper as it is advanced. The means for advancing the chart paper includes a stepping motor so that, if desired, a reference other than time can be utilized.

More particularly, as shown in the drawings, the strip chart recorder consists of a rectangular box-shaped framework 11, formed of a suitable material such as sheet metal, which has an open front side. A U-shaped frame 12 is disposed within the framework 11 and is provided with side walls 13 and 14 and a front wall 16. Means is provided for pivotally mounting the frame 12 in the framework 11 and consists of a rod 17 which extends through the lower forward portions of the side walls 13 and 14 and which is mounted in the framework 11. A front plate or platen 18 is mounted on the front wall 16 of the frame 12 by suitable means such as bolts 19. The platen is provided with an upper curved portion 18a which extends first upwardly and then rearwardly and then downwardly to provide a curved surface over which the chart paper travels during engagement by the pen means as hereinafter described.

Figure 2:
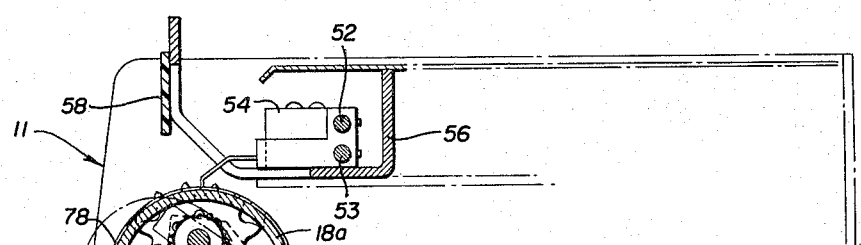
FIGURE 2 is a side elevational view in cross-section of the strip chart recorder shown in FIGURE 1 showing the tilt-out feature for loading the chart paper.

Means is provided for limiting the travel of the frame 12 between a normal inner position as shown in solid lines in FIGURE 2 and a tilted-out position shown in broken lines in FIGURE 2. This means consists of studs 21 mounted on the outer sides of the side walls 13 and 14 and which are adapted to engage stops 22 and 23 provided on the sides of the framework 11. Thus, stops 22 serve to define the normal or inner position in which the front surface of the platen 18 is inclined upwardly and to the rear and stops 23 define the tilted-out position in which the platen 18 is tilted away from the front of the framework 11.

Figure 3:
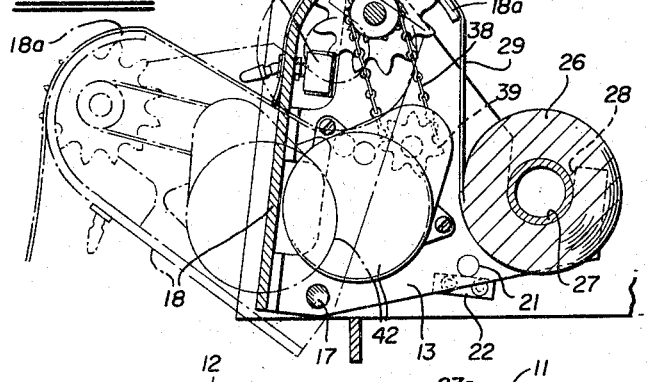
FIGURE 3 is a cross-sectional view of a portion of the strip chart recorder shown in FIGURES 1 and 2 and particularly showing the drive mechanism utilized.
Figure 4:
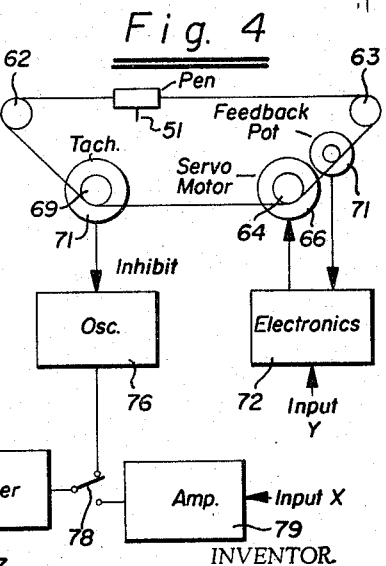
FIGURE 4 is a schematic illustration of the pen driving mechanism and the associated electronics in block form, and the drive for the stepping motor.

The frame 12 is adapted to receive a roll 26 of chart paper. The roll 26 is provided with a mandrel 27 which has portions 27a which extend beyond the ends of the roll of paper 26 (see FIGURE 3). The inner end portions of the side walls 13 and 14 of the U-shaped frame 12 are provided with relatively large upwardly facing U-shaped slots 28 which are adapted to receive the end portions 27a of the mandrel 27 to provide bearing means for the mandrel 27 and the roll 26 carried thereby. The chart paper 29 is payed off from the bottom of the roll 26 and extends upwardly over the platen 18.

Means is provided for advancing the chart paper 29 from the roll 26 and consists of a pair of sprockets 31 and 32 which engage perforations 33 and 34 provided in the chart paper. The sprockets 31 and 32 are secured on opposite ends of a shaft 36 rotatably mounted in bearings 37 carried by the side walls 13 and 14 of the frame 12. The shaft 36 is driven by a sprocket 37 secured to the shaft. The sprocket 37 is driven by a chain 38 which is driven by a sprocket 39 mounted on the output shaft 41 of a stepping motor 42. The stepping motor can be of a suitable type such as the Series 44600, supplied by the A. W. Haydon Co. of Waterbury, Conn. The stepping motor 42 is mounted upon posts 43 provided on the side wall 13 by suitable means such as screws 44.

Pen means is provided as a part of the strip chart recorder and is adapted to engage the chart paper as it is advanved over the platen 18. The pen means consists of a pen 51 which is slidably mounted on a pair of rods 52 and 53. The rods 52 and 53 are mounted in blocks 54 supported by brackets 56 secured to the side walls of the framework 11. A scale 58 is also mounted upon the brackets 56 by suitable means such as screws 59.

The pen 51 is driven on the Y-axis by an endless cord 61. The cord 61 is reeved over a pair of pulleys 62 and 63 and is driven by a pulley 64. The pulley 64 is driven by a servomotor 66. The endless cord 61 drives a pulley 67 of a feedback potentiometer 68 and the pulley 69 of a tachometer 71. The output of the feedback potentiometer is supplied to electronics 72 of a conventional type which compares this feedback signal with the Y input signal and supplies a signal to drive the servomotor 66 until a null balance condition is reached. Alternatively, the electronics can be of a type disclosed in copending application Ser. No. 547,498, filed May 4, 1966.

The stepping motor 42 is driven by a driver 73 of a suitable type such as Model 2P72786, supplied by the A. W. Haydon Co. of Waterbury, Conn. Pulses from any periodic or aperiodic source to form the X input can be used for actuating the driver. Thus, if the strip chart recorder is to be used for multi-channel recording or for pulse height analysis, the output of oscillator 76, of a suitable type such as one which produces 10 pulses per second, is used for the X input event source. The tachometer 71 supplies an inhibit signal to the oscillator 76 and prevents its from producing output pulses during the time the pen 51 is moving and a signal is being received from the tachometer. When a signal is not being received from the tachometer 71, the oscillator 76 supplies pulses through a switch 78 to the driver 73 which drives the stepping motor or stepper 42 hereinbefore described. Alternatively, the X input events can be supplied to an amplifier 79 through the switch 78 to the driver 77 so that the stepping motor 42 is only advanced when an input event is received.

The framework 11 is secured to a conventional front panel 81 by suitable means such as screws 82. The front panel 81 is provided with slots 83 on its side edges to facilitate mounting in a conventional rack.

Operation and use of the strip chart recorder may now be briefly described as follows. Let it be assumed that it is desired to load a roll of chart paper 26 into the strip chart recorder and that the chart paper is printed on the inside; in other words, it is printed on the face which is rolled onto the roll 26. When such is the case, the frame 12 is moved to its outermost or its tilted-out position by grasping the platen 18 with one hand and moving it outwardly over the center position to the broken line position shown in FIGURE 2. In this position of the frame 12, it can be seen that the U-shaped slots 28 are readily accessible and face the operator, and that there is sufficient space between the curved portion 18a of the platen and the scale 58 to permit the paper roll 26 to be lowered downwardly so that the ends 27a of the mandrel 27 are disposed within the U-shaped slots or recesses 28.

As soon as the roll has been loaded into the frame 12 so that the paper can be payed off from the bottom as shown in FIGURE 2, the chart paper 29 is pulled from the roll 26 over the curved portion 18a of the platen 18 so that the perforations 33 and 34 engage the sprockets 31 and 32 also carried by the frame 12. As soon as this has been accomplished, the frame 12 can be lifted and returned inwardly to its normal position as shown in FIGURE 2 in which the studs 21 are in engagement with the stops 22.

Thus, it can be seen that loading of the strip chart recorder with chart paper can be accomplished in a matter of seconds. The roll 26 can be merely dropped into place without alignment with any complicated mechanisms. The mandrel 27, which is normally formed of cardboard, rotates within the U-shaped slots formed within the frame 12 which provides an inexpensive mounting for the chart roll and, in addition, provides very little friction so that the chart paper can be readily advanced by the stepping motor 42.

The stepping motor 42 advances the chart paper in known increments and makes it possible to provide a reference other than time which is the case when a synchronous motor drive is utilized for driving the chart paper. The stepping motor 42 can be advanced in any suitable manner. Thus, for example, it can be advanced by the oscillator 76 which is under the control of the output of the tachometer 71 so that the chart paper is only advanced when the pen 51 is not moving. Alternatively, the chart paper can be advanced upon the receipt of each input event by supplying the input event to an amplifier 79 which provides a pulse to the driver 77 to operate the stepper. For example, a heart beat or any other event, whether it be random or periodic, can be utilized for operating the stepping motor 42.

The drive for the pen 51 is of a type which provides a null balance potentiometric recorder. In other words, the pen 51 is driven along the Y-axis by the servomotor 66 until the output of the feedback potentiometer 71 is equal to the input signal supplied to the electronics 72. With such a null balance, it is possible to operate the recorder at a much faster stepping rate. This is true because by utilizing the null balance, it is not necessary to allow enough time to permit the servomotor 66 to drive the pen 51 through a complete or full excursion of the Y-axis. Thus, it can be seen that if the pen 51 normally stops after one-tenth of the time in which it would normally require it to travel through the entire Y-axis, it is possible to step along the X-axis at ten times greater rate than would be normally possible. This is true because normally it is not desirable to move the chart paper along the X-axis while the pen is still moving along the Y-axis.

It is apparent from the foregoing that there has been provided a new and improved strip chart recorder which can be rapidly and readily loaded with chart paper. In addition, the chart paper is mounted in such a manner that it can be readily driven by a stepping motor so that the chart paper can be advanced with a reference other than time, if so desired. Also, it can be advanced in accordance with time by merely supplying pulses in a timed relationship to the stepping motor. The strip chart recorder is relatively compact which particularly adapts it for rack mounting and other applications such as incorporation in bench type models.

We claim:

1. In a graphic recorder for sequentially plotting data from a source on a chart wherein a servo mechanism drives a record marking mechanism along the Y-axis of the chart and means is provided for causing relative movement between the marking mechanism and the chart along the X-axis of the chart, means for sensing the rate of movement of the record marking mechanism along the Y-axis and generating a rate signal when the marking mechanism is moving, said means for causing relative movement including a stepper motor, means for supplying pulses, and means connected to the means for sensing the rate of movement of the record marking mechanism along the Y-axis and connected to said means for producing pulses and to said stepper motor for controlling the passage of pulses to said stepper motor.

2. In a graphic recorder for plotting of analog values from a multi-channel source on a chart, the combination of: marking means mounted for movement along the Y-axis of the chart and adapted to plot a record of said analog values on the chart, a servo mechanism operable responsive to an input analog signal from said multi-channel source to move the marking means along the Y-axis of said chart to a null position proportional to the amplitude of said input signal; means for stepping one of said chart and said marking means relative to the other a predetermined distance along the X-axis, means for generating pulses, and means for sensing movement of said marking means along the Y-axis and connected to said means for stepping and to said means for generating pulses for supplying pulses to said means for stepping when it is sensed there is no movement of the marking means along the Y-axis.

3. In a strip chart recorder for use in recording Y input signals, marking means mounted for movement along the Y-axis of the strip chart, means mounting the chart for movement of the chart along the X-axis, drive means including a stepper motor for advancing the strip chart, a servomotor, a feedback potentiometer, a tachometer, an endless member driven by said servomotor and driving said feedback potentiometer, said tachometer and said marking means, electrical circuit means adapted to receive said Y input signals and connected to said servomotor and to said feedback potentiometer and serving to compare the feedback signal from the feedback potentiometer with the Y input signal and supplying a signal to drive the servomotor until a null balance condition is reached, means for supplying X input events into the drive means for advancing the chart and means connected to the tachometer and to the means for supplying X input events for inhibiting the means for supplying X input events when the marking means is moving.

4. A strip chart recorder as in claim 3 together with a pair of pulleys disposed on opposite sides of said marking means, said endless member being reeved over said pulleys so that said marking means can only travel between said pulleys.

5. A strip chart recorder as in claim 4 wherein said means for supplying X input events is an oscillator.

6. A strip chart recorder as in claim 3 wherein said marking means mounted for movement along the Y-axis of the strip chart includes means for limiting travel of said marking means along the Y-axis between two spaced points on the Y-axis.

7. In a strip chart recorder of the type adapted to be used in conjunction with a roll of chart paper having a mandrel extending beyond the ends of the roll of chart paper, a framework, a frame including a platen disposed adjacent the upper portion of the frame, said frame being formed with spaced substantially U-shaped upwardly facing slots at the lower portion of the frame and to the rear of the platen, means pivotally mounting said frame in said framework for movement between a normal position and a tilted-out position, said frame and said framework being formed so that when said frame is in its tilted-out position a substantially upwardly facing opening is provided between the frame and the framework to permit a roll of chart paper to be readily lowered through the opening into the frame and to seat the extended mandrel of the roll of chart paper within the substantially U-shaped slots of the frame, said roll of chart paper being retained in said slots solely by force of gravity, means mounted on said frame for engaging the chart paper after it has come in contact with the platen for advancing the chart paper directly from the roll and over the platen, said means mounted on said frame including a stepper motor and means for supplying pulses to the stepper motor, pen means carried by the framework and adapted to engage the chart paper as it is advanced and means for advancing the pen means, said means for supplying pulses to the stepping motor including an oscillator and means for inhibiting the oscillator when the means for advancing the pen is advancing the pen.

8. In a strip chart recorder, a framework, a frame, means pivotally mounting said frame in said framework for movement between a normal position and a tilted-out position, a one-piece platen mounted on said frame for movement with said frame, said platen extending across the entire width of the frame and having a planar portion and a curved portion, said portions also extending across the width of the frame, said planar portion being in a substantially horizontal position when said frame is in its normal position, said frame including a pair of substantially parallel spaced side wall members, said side walls being formed with spaced, substantially U-shaped upwardly facing slots at the lower rear extremities of the side wall members, said curved portion of said platen having a pair of spaced slots therein, a shaft mounted in said side frame members, a pair of sprockets mounted on the shaft and having their teeth extend through the slots in the platen for engagement with the strip chart, means for driving the shaft, pen means adapted to engage the chart paper as it travels over the curved surface of the platen, means mounted on the framework for shifting the position of the pen means, said frame, said platen and the means for rotating the shaft being movable as a unit between said normal position and said tilted-out position, said frame when in a tilted-out position forming with said framework an upwardly facing opening permitting ready access to said U-shaped recesses in the side plates to facilitate easy loading of a roll of chart paper into the frame.

9. A strip chart recorder as in claim 8 together with a roll of chart paper, said roll of chart paper having an extended mandrel of relatively large diameter adapted to be seated in the U-shaped recesses, the weight of said roll of chart paper causing frictional engagement between the mandrel and the U-shaped slots formed in the side wall members to provide the sole means restraining movement of the roll of chart paper as the chart paper is unwound from the roll and advanced by the sprockets over the platen.

References Cited

UNITED STATES PATENTS

| | | | |
|---|---|---|---|
| 1,847,918 | 3/1932 | Blanchard | 346—68 |
| 2,924,499 | 2/1960 | Young et al. | 346—145 |
| 3,048,848 | 8/1962 | May | 346—78 |
| 3,125,400 | 3/1964 | Moyano | 346—34 |
| 3,135,574 | 6/1964 | Lenfant | 346—139 |

RICHARD B. WILKINSON, *Primary Examiner.*

J. W. HARTARY, *Assistant Examiner.*